(12) United States Patent
McDermott

(10) Patent No.: US 8,015,601 B2
(45) Date of Patent: Sep. 6, 2011

(54) CONTROLLER FOR EVENT-BASED STATISTICAL COVERT CHANNELS

(75) Inventor: John P McDermott, Annandale, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 1088 days.

(21) Appl. No.: 11/777,932

(22) Filed: Jul. 13, 2007

(65) Prior Publication Data

US 2011/0099642 A1    Apr. 28, 2011

Related U.S. Application Data

(60) Provisional application No. 60/807,295, filed on Jul. 13, 2006.

(51) Int. Cl.
*G06F 9/00* (2006.01)
*G06F 7/04* (2006.01)
(52) U.S. Cl. .......................................... 726/11; 726/26
(58) Field of Classification Search .................... 726/11, 726/26
See application file for complete search history.

*Primary Examiner* — Philip Lee
(74) *Attorney, Agent, or Firm* — Amy L. Ressing; L. George Legg

(57) ABSTRACT

A controller for an event-based statistical covert channel includes a data receiver; a data transmitter; and a channel controller that includes a fixed distribution randomized event buffer construction processor (FDREBCP) and a fixed distribution randomized event buffer (FDREB). The FDREBCP holds event distribution data that define one or more fixed distributions that the FDREBCP employs to fill the FDREB, whereby the event distribution data is stored during the occurrence of the event, subsequently removed from the FDREB and reordered, and a dummy event distribution data created to prevent an unauthorized outsider modulating the timing of events by alternatively causing and not causing the event.

12 Claims, 4 Drawing Sheets

CONTROLLER FOR EVENT-BASED STATISTICAL COVERT CHANNELS

CROSS-REFERENCE TO RELATED APPLICATIONS

This application is a Non-Prov of Prov (35 USC 119(e)) application 60/807,295 filed on Jul. 13, 2006.

BACKGROUND OF THE INVENTION

The present invention relates generally to a method and apparatus for blocking access to an information processing system by an unauthorized user, and more particularly to such a method and apparatus where a channel boundary is employed to allow access just by legitimate users.

For purposes of the present invention and its background, we consider situations where there is an information flow boundary that is intended to prevent unwanted outward flow of information from one or more information technology products while allowing desired information flows. The information flow boundary is enforced by one or multiple information technology products acting as a boundary controller. One possible function of a boundary controller is to prevent or mitigate covert channels. In information theory, a covert channel is a parasitic communications channel that draws bandwidth from another channel in order to transmit information without the authorization or knowledge of the latter channel's designer, owner, or operator. A covert channel is so called because it is hidden within the medium of a legitimate communications channel. The detection of a covert channel can be made more difficult by using characteristics of the communications medium for the legitimate channel that are never controlled or examined by legitimate users. For example, a file can be opened and closed by a program in a specific, timed pattern that can be detected by another program, and the pattern can be interpreted as a string of bits, forming a covert channel. Since it is unlikely that legitimate users will check for patterns of file opening and closing operations, this type of covert channel can remain undetected for long periods.

A storage channel, e.g. as defined in Ira S. Moskowitz and Myong H. Kang, *Covert channels—here to stay?*, In Proc. *COMPASS '94*, pp. 235-243 (Gaithersburg, Md., June 1994) (hereinafter "Moskowitz1"), is a covert channel where the output alphabet consists of different behaviors whose timing is irrelevant. Moskowitz defines a timing channel as a covert channel where the output alphabet is made up of different time values corresponding to the same response. For purposes of the present invention and its background, we are interested in a class of covert channels where the output alphabet consists of different values of a statistic S defined on behavior or timing, hence both the timing and the behavior per se are not used as the alphabet. As defined in Ira S. Moskowitz and Myong H. Kang, *Discussion of a statistical channel*, In Proc IEEE-IMS Information Theory Workshop on Information Theory and Statistics (Alexandria, Va., October 1994) (hereinafter "Moskowitz2", and incorporated herein by reference), we call this kind of channel a statistical covert channel. Moskowitz2 identified the statistical covert channel that is present in the NRL Pump. The NRL Pump is a boundary controller that blocks storage and timing covert channels but could possibly have a timing-based statistical covert channel: that is, the covert channel is based on varying a statistic defined over the timing of an event. This differs from event-based statistical covert channels; that is, covert channels based on varying a statistic defined over the occurrence of an event.

The problem of statistical channels is that they can be present in systems that have minimal or no storage or timing channels, either inherently or because of boundary controllers that block or minimize them. In systems that lack measures to prevent storage or timing channels, statistical covert channels are of little interest. In systems that implement effective measures against storage and timing channels, statistical channels are significant. This is particularly of concern in systems where events happen at Giga Hertz rates.

An early work on covert channels in local area networks described in C. G. Girling, *Covert channels in LAN's*, IEEE Transactions on Software Engineering, SE-13(2):292-296 (February 1987), identifies and analyzes storage and timing channels that can be constructed on events visible outside a host on the LAN. Secure networks and their protocols usually consider all of the channels analyzed by Girling. B. Venkatraman and R. Newman-Wolfe, *Performance analysis of a method for high level prevention of traffic analysis using measurements from a campus network*, In Proc. Tenth Annual Computer Security Applications Conference, pages 288-297 (Orlando, Fla.) December 1994, and B. Venkatraman and R. Newman-Wolfe, *Capacity estimation and auditability of network covert channels*, In Proc. IEEE Symposium on Security and Privacy, pp. 186-198 (Oakland, Calif.) describe systems for preventing covert channels in local area networks (in fact any information technology product for which we can define the traffic matrix). Their notion of temporal neutrality exemplifies strong defense against information flow.

Moskowitz2 was the first to discuss covert channels based on varying statistics. It focused on statistics for the timing of replies, as the timing of those replies is managed by the NRL Pump information flow security mechanism. It is interesting to note that the Pump, at least in principle, does not have event-based covert channels because a "high" process connected to a Pump is not capable of causing distinguishable events.

Moskowitz2 and others address sophisticated timing-related covert channels that exist in systems with strong information flow boundaries. The approach is another example of a channel that would be of no significance, if there were no defenses against less sophisticated channels. While their work is focused on anonymity mechanisms, the results apply to many forms of strong information flow boundaries. The channels addressed by their work are not timing channels per se, but they do relate to time, so they are distinct from event-based channels, which do not exploit time.

Event-based covert channels exploit neither storage contents nor timing, and can happen in networks with temporal neutrality. Instead, the occurrence of events is counted. Consider a system with strong information-flow boundaries in which there are at least two classes of externally visible events: the distinguished event used to form the statistical channel, which we denote by x, and the other events, which we denote by y. Both classes of events are visible outside of the system's information flow boundary. An insider, referred to as Alice for purposes of discussion, wishes to transmit a message to Eve but Eve is outside the system's information flow boundary, as shown in FIG. 1. In practice, Alice is not a person but one or more information technology devices that are being exploited by a Trojan horse or other malicious program. Alice cannot control any bit patterns associated with either class of event, nor can she affect the order or timing of the events. What Alice can do is cause event x or y to happen, outside the information flow boundary. In theory, events x or y could be delayed indefinitely, but in practice, the system Alice is using most probably will provide best effort service and the events will happen shortly after Alice requests them.

The events used to form these channels can be any phenomenon that might be found or used in information technology including not only electrical, mechanical, radio, and infrared signals but also computation events such as creation, communication, receipt, storage, or destruction of message or database record.

BRIEF SUMMARY OF THE INVENTION

According to the invention, a controller for an event-based statistical covert channel includes a data receiver; a data transmitter; and a channel controller that includes a fixed distribution randomized event buffer construction processor (FDREBCP) and a fixed distribution randomized event buffer (FDREB). The FDREBCP holds event distribution data that define one or more fixed distributions that the FDREBCP employs to fill the FDREB, whereby the event distribution data is stored during the occurrence of the event, subsequently removed from the FDREB and reordered, and a dummy event distribution data created to prevent an unauthorized outsider modulating the timing of events by alternatively causing and not causing the event.

Also according to the invention, a method of limiting event-based covert channels blocks occurring outside an information flow boundary includes sampling an event; calculating a running estimate of a statistic associated with the event; and applying the channel controller (FDREBCP and FDREB) to the event to control a bit pattern, timing, and ordering that are allowed outside the information flow boundary. As discussed, this includes storing the event in the FDREB, subsequently removing and reordering the event, and creating the dummy event.

The existence of event-based covert channels, along with the timing-based statistical channels identified by Moskowitz2, suggests a modest extension to the temporal neutrality of Venkatraman and Newman: statistical neutrality where the temporal neutrality five-tuple (V, F, 0, N, L) is extended to include another transmission characteristic statistics S, which should not be available for modulation. The resulting six-tuple (V, F, 0, N, L, S) reflects the added protection provided by the invention. The invention produces an information flow boundary with statistical neutrality.

A boundary controller that produces temporal neutrality controls the bit patterns, timing, and ordering of individual events that are allowed outside the information flow boundary. In order to enforce these restrictions on timing and ordering in a fair way, the boundary controller needs to store the events in some kind of buffer. The buffer may be a hardware device, a software program, or a combination of software and hardware. Events are stored in the buffer as they happen, but are removed from the buffer and made visible outside the information flow boundary, in a different order, possibly with different timing. Creation of dummy events by the boundary controller is used to prevent Alice from modulating the timing of events by alternatively causing e and x to happen.

A simple round-robin strategy will close both timing-based and event-based statistical channels. For example, if a boundary controller is managing network packets leaving a protected enclave, with 8 allowable destination addresses corresponding to events $e_0 \ldots e_7$, then a round-robin strategy would send one actual or dummy packet to destination address $e_0$; then after a fixed time interval, one $e_1$ packet is sent and so on, until exactly one packet for each address has been sent. Then the round-robin cycle starts over again. What the round-robin strategy does is remove Alice's ability to modulate the statistic S defined on destination addresses. While this works in principle, in practical systems it performs poorly because it is not fair. From the example, if the actual event destination address $e_3$ legitimately happens 10 times more frequently, a round-robin strategy will not be fair and thus perform poorly.

Our invention is a boundary controller with statistical neutrality and is referred to in this context as a channel controller. Our channel controller uses event buffers with typed elements to enforce a fixed probability distribution on the events. We call this kind of buffer a fixed distribution randomized event buffer or clamp. Each possible variation in an event that is visible outside the information flow boundary is given its own type. The empty cells or elements of the clamp buffer are assigned one of these types, according to the desired fixed probability distribution. When an event of type $e_i$ happens, the clamp places it in the first available buffer element of type $e_i$.

Since the assignment of events to clamp buffer elements is fixed, the distribution of event types is fixed. To allow for reordering of events, we assign typed elements in a random order, from the fixed pool of typed buffer elements. For example, if we have four possible event types $e_0, e_1, e_2, e_3$, we could have a fixed pool of eight typed buffer elements represented by the multiset $\{e_0, e_1, e_1, e_2, e_2, e_2, e_2, e_3\}$, that is, there are four type $e_2$ events for every $e_0$ type event in the buffer. FIG. 2 depicts this. The buffer elements may be marked or typed in any order. The clamp consumes the buffer by taking events out of the buffer and asserts them outside the information flow boundary.

To provide a constant event rate, the clamp creates multiple buffers and consumes them at a constant rate. For example while a buffer $B_i$ is being consumed, buffers $B_{i+1}, B_{i+2}, \ldots, B_{i+k}$ are being created and filled. If the buffer that is scheduled for release is not full, the clamp fills it with dummy events of the corresponding type, for each empty buffer element.

The advantage of the clamp solution presented here is that it can block or limit event-based covert channels that other forms of boundary controllers cannot. For example, a temporally neutral boundary controller for a packet switched network restricts outgoing packets to be a fixed size and to leave the information flow boundary at a fixed rate (constant traffic volume) in an order different from the sending order. It also restricts all packet header fields to be fixed, except the destination address. The destination addresses are limited to a small fraction of the possible addresses. In spite of these fairly robust security measures, the event-based statistical channel is still present, with a significant data rate.

The proposed solution blocks the event-based covert channel without imposing long term performance or functional restrictions. The salient features of this solution are:
1. it enforces a discrete probability distribution on the events visible outside the information flow boundary that is highly resistant to modulation.
2. the probability distribution is enforced through typed buffers,
3. in its tunable form, this solution allows the probability distribution to be adjusted to suite performance and security requirements, and
4. adjustments to the distribution can be used to detect the use of event-based covert channels.

DETAILED DESCRIPTION OF THE INVENTION

The present invention is directed to statistical covert channels and a mechanism that blocks or limits event-based statistical covert channels.

Figure 1:
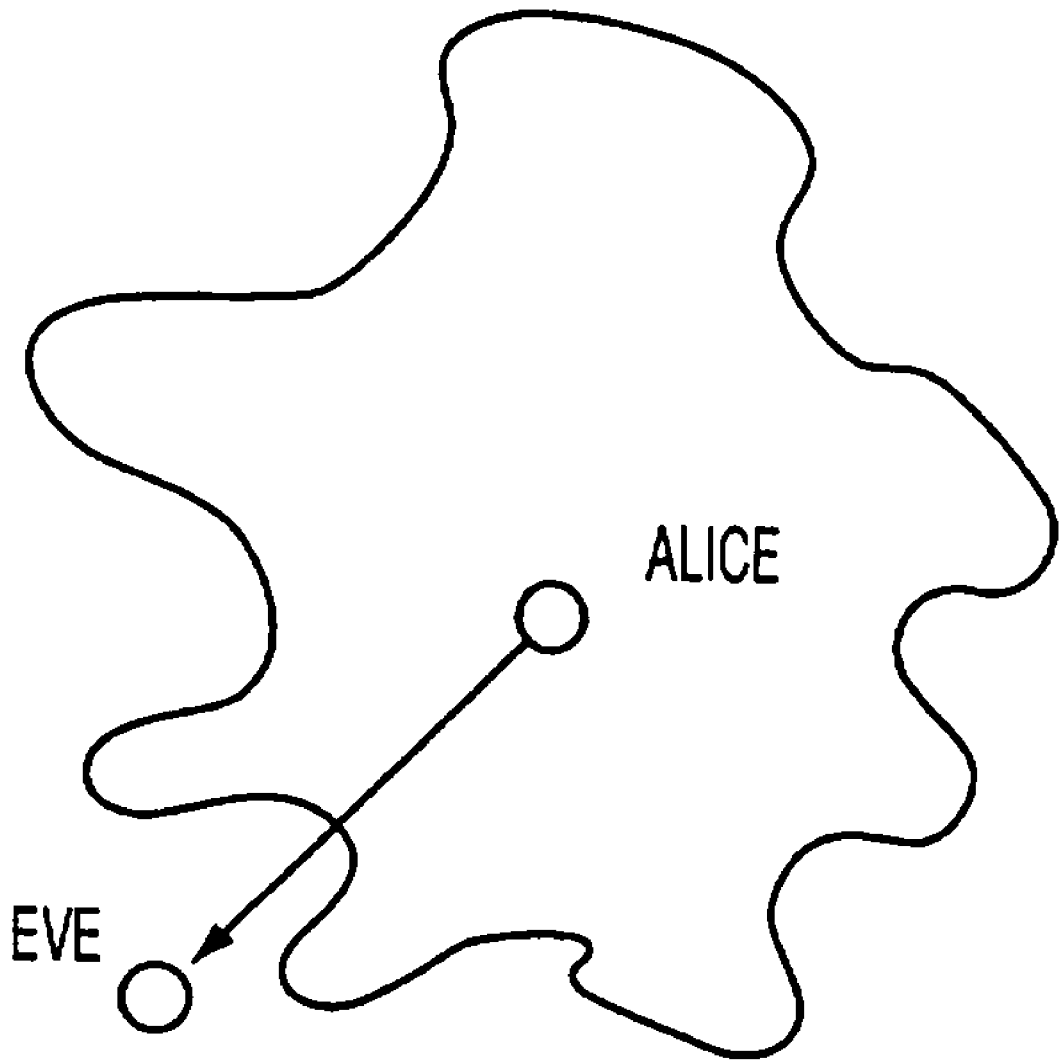
FIG. 1 is a schematic diagram depicting an information flow boundary.

Initially, consider a system in which there are two classes of events: the distinguished events, which we denote by x and the other events, which we denote by y. Both classes of events are visible outside of the system's information flow boundary. An insider Alice (in practice, Alice is not a person but one or more network devices which are being exploited for malicious purposes) wishes to transmit a message to Eve but Eve is outside the system's information flow boundary, as shown in FIG. 1. Alice cannot set any bit patterns associated with either class of event, nor can "she" affect the order or timing of the events. What Alice can do is cause event x or y to happen, outside the information flow boundary.

In theory, events x could be delayed indefinitely, but in practice, the system Alice is using most probably will provide best effort service and the events will happen shortly after Alice requests them. By requesting or not requesting large numbers of x events, Alice can vary the distribution of x events occurring outside the system's information flow boundary. Eve can now sample or record the events and calculate running estimates of a statistic S calculated on event e. For example Eve could compute a simple moving average. Eve can interpret changes in this moving average as a signal from Alice.

Figure 4:
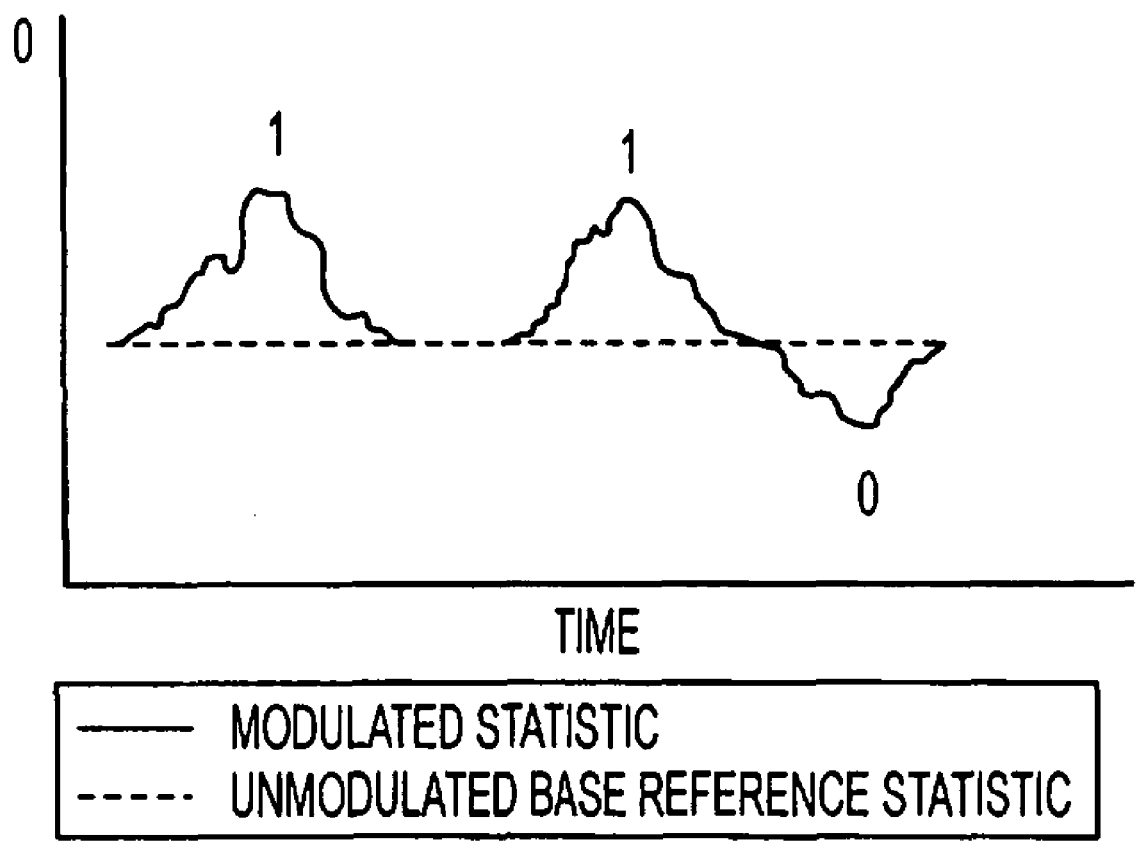
FIG. 4 is a schematic diagram depicting the modulation of a statistic, for the purposes of transmitting a message.

The simplest interpretation of this variation is to interpret an increase in S followed by a decrease in S back to its base (unmodulated) level as single bit. In many situations, symmetry will allow Alice to both raise and lower S with respect to the base (unmodulated) value of S, as shown in FIG. 4 which depicts encoding of the sequence 110 with respect to the base value of S. This modulation of S gives Alice a straightforward means of encoding symbols for transmission to Eve.

As we have described it, an event-based statistical channel is a simplex broadcast channel. In some scenarios, this may be of little use to Alice and Eve. In other situations, an event-based statistical covert channel may be used to leak information from a protected site into an untrusted network (e.g. the Internet). Since the channel is simplex. Eve can record the raw sequence of events as they happen and process them later. The concept is similar to the simplex transmission of images of distant planets, by remote spacecraft. A single image is sent slowly over a noisy simplex channel and recovered into viewable form by additional processing after the image is transmitted.

Description and Operation

Figure 2:
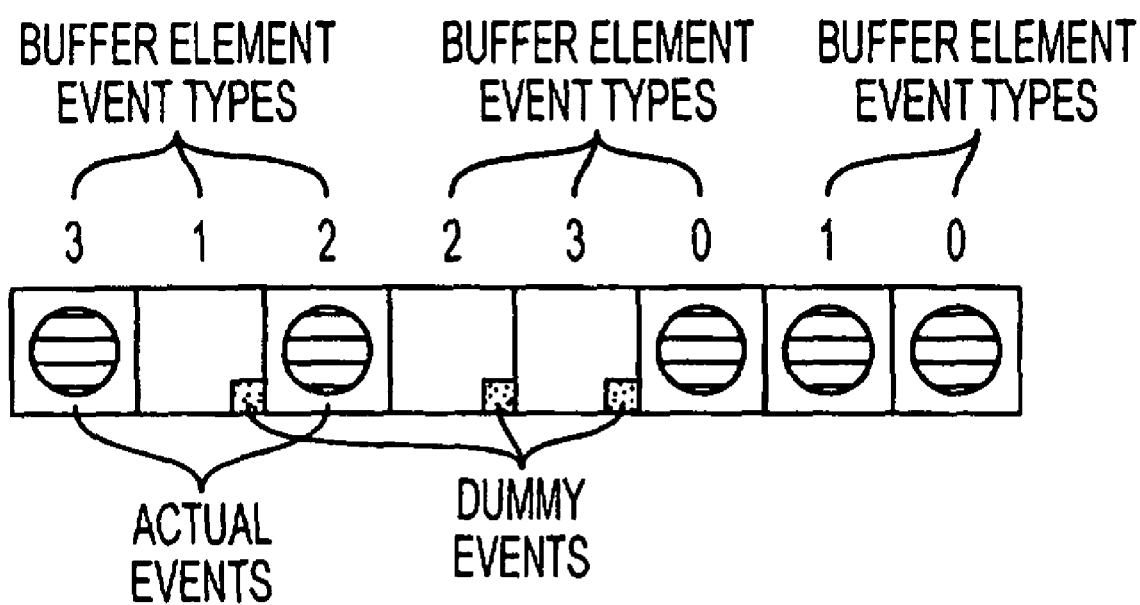
FIG. 2 is a schematic diagram of the basic structure of a fixed distribution randomized event buffer.
Figure 3:
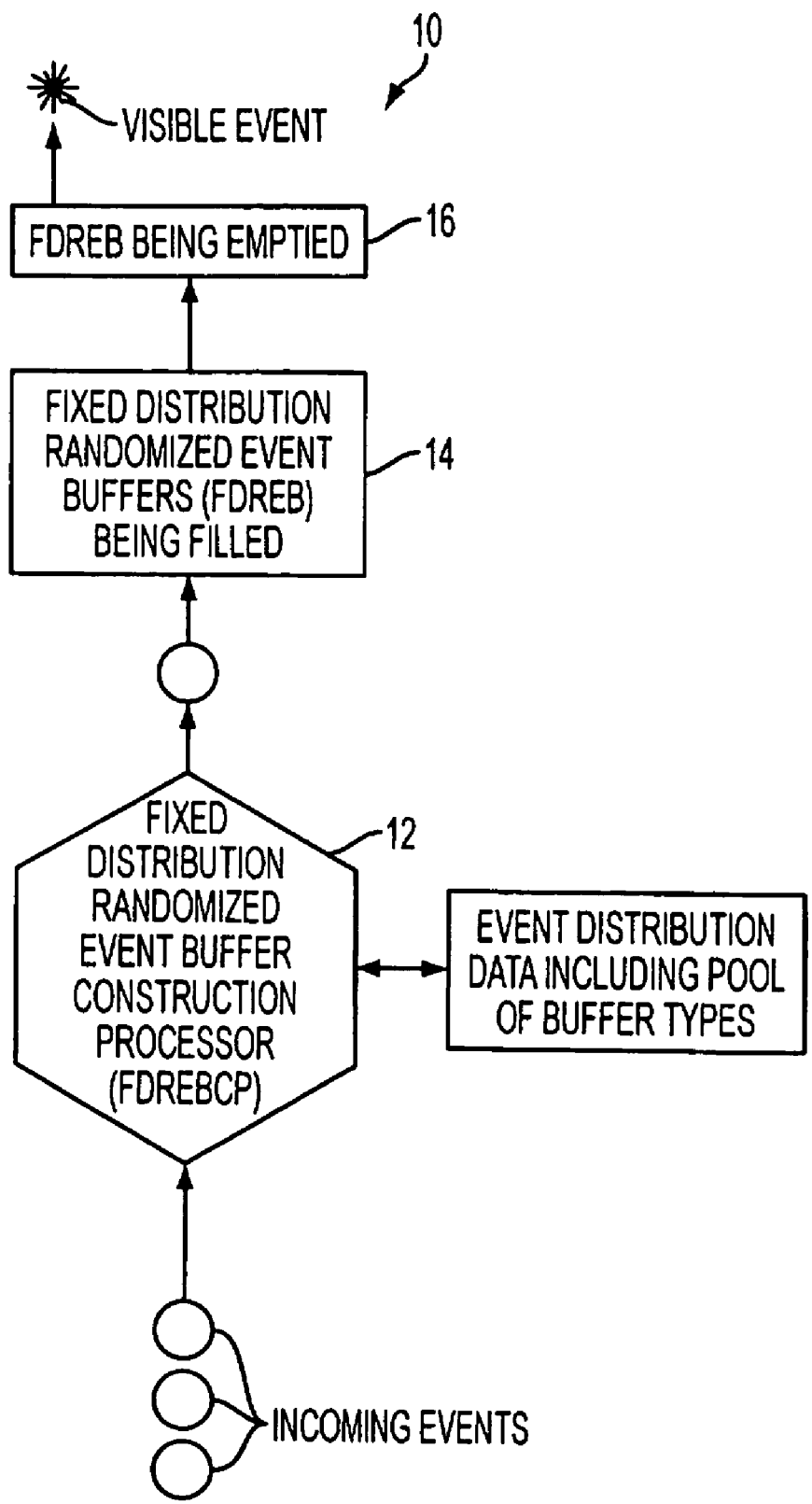
FIG. 3 is a schematic diagram of a channel controller according to the invention.

The channel controller consists of a fixed distribution randomized event buffer construction processor or FDREBCP, and one or more faxed distribution randomized event buffers or FDREB's. The FDREBCP and the FDREB's may be implemented in hardware, software, or both. The events recorded or represented in the buffers may include the creation, destruction, storage, transmission, or processing of data; the sending or receiving of physical hardware signals, including electrical, radio, infrared, chemical, or mechanical events; or the completion of a computation, including measurement of time. The actual events may or may not be held in the FDREB's. In some realizations, the FDREB's record each event for management purposes and the events are permitted or inhibited by another means, under control based on the records in the FDREB's. The FDREBCP holds event distribution data that define one or more fixed distributions that the FDREBCP will use to fill the FDREB's. The event distribution data may be in the form of hardware, software, or both. Events to be managed by the controller, or their corresponding records, enter the FDREBCP and are placed in the appropriate buffers according to the types of the events. The FDREBCP uses the event distribution data to define a fixed pool of typed buffer elements to be assigned to each buffer it constructs. Events in a buffer are inhibited until the buffer is filled and released by the FDREBCP. Events may be placed into individual FDREB's in a random order or alternatively, there may be multiple FDREB's with elements in fixed order but the FDREB's are released in a random order. FIG. 3 illustrates an embodiment of the invention, showing a controller 10 for an event-based statistical covert channel that includes a FDREBCP 12, for receiving and processing one or more incoming events, coupled to a FDREB 14, illustrated also in FIG. 2. FDREP 14 is shown as coupled to a receiver 16 that represents the FDREP 14 being emptied and transmitted as described further herein. Another 2-way block to the FDREBCP is shown for the event distribution data including pool of buffer types. The output of controller 10 is then the visible event or transmission as described herein.

An alternative form of the invention provides for tunable, partial, or adjustable control of event-based statistical channels. The previous solution provides fairness when the actual distribution of events does not vary much from the distribution used to design the FDREB type assignment. Some events in computer systems have distributions that vary significantly over time and the variation is not constant, that is, the events happen in unpredictable bursts. One solution to this aspect of the problem is to incorporate untyped or free elements in the FDREB's of the fixed solution. The untyped elements may be filled with events of any type. If the untyped buffer elements are placed next to each other in a FDREB then they constitute a smaller, unrestricted buffer. While this realization is a valid instance of the channel controller invention, careful digital signal processing by an adversary could be used to exploit this. The best realization of a tunable channel controller uses untyped buffer elements allocated in a random order that prohibits groups of adjacent free or untyped elements.

An alternate realization of the channel controller adjusts the assignment of types to buffer elements to match the current demand. Since the FDREB's are filled and released, it is not difficult for the FDREBCP to change the type assignment as empty buffers are refilled. The approach is 1) use an adjustable pool of buffer elements instead of the fixed pool, and 2) to count the number of excess events of each class and adjust the proportion of buffer elements of the corresponding type, in the adjustable pool. For example, the implementation could be that if there are k excess events of type $e_i$ then a buffer element of type $e_i$ could replace another element of the adjustable buffer pool that is used to fill the FDREB's. The best strategy to use for determining the new probability distribution would be to have the FDREBCP maintain a running count of each type of event. This would allow the FDREBCP to compute the actual statistics for each type of event. Adjustments would then be made based on the difference between the current buffer distribution and the event distribution. The specific strategy chosen would depend on the desired balance between covert channel restriction and overall system performance.

An Example Statistical Covert Channel in Packet-Switched Networks

A concrete example will help to clarify the problem and its solution by our invention. Consider a statistical covert channel that uses message transmission in a packet-switched network as the basic event. The example network encrypts the packet contents, as in a virtual private network. Information flow is further protected by a boundary controller that is designed to prevent covert storage and timing channels. In packet-switched networks, this type of boundary controller is often referred to as a traffic shaper. The boundary controller restricts the header contents, so that most of the header fields are fixed. In our example, we only allow packet destination address to vary. All other header fields are fixed, including packet length, so all packets are the same size. The allowable destination addresses are limited to 8 distinct addresses. To restrict covert timing channels the boundary controller holds outgoing packets in a buffer. Packets in the buffer are randomly reordered before transmission, according to a uniform distribution. When there are no outgoing packets the boundary controller generates dummy packets so that the buffer always contains packets. Packets are removed from the buffer and transmitted so that the rate of transmission is practically constant. The result of this boundary controller strategy is that destination address is the only attribute of a packet transmission that is allowed to vary in any useful way.

The sender Alice can only cause packets with a certain destination. She cannot control the order or the time at which the packets will be sent or what kind of packets may be sent between the packets she causes. She cannot modulate the rate of packet transmission because packets are sent at a constant rate. In spite of this, Alice can modulate the mean number of packets having a certain attribute, and this provides a simplex channel for leaking information.

A Simplex Statistical Channel

Our channel must be based on a statistic S about a packet with a distinguished destination address. We call these packets x packets. We chose to use the mean number of x packets transmitted during an interval which we call the signal construction window. Since timing is irrelevant for this channel (also, the boundary controller transmits packets at a constant rate) we define the signal construction window in terms of packet transmissions rather than times. So a signal construction window might have a width of 64 packets rather than 64 microseconds. The mean number of x packets sent in construction window $w_i$ becomes the basic signal $x_i$ transmitted on the channel.

Transmission

The basic signal is transmitted as a digital signal using 4B5B symbol encoding. As in other media such as optical and electrical, 4B5B encoding provides efficient coding of bits while providing synchronization or timing recovery. The actual data transmission is accomplished using a non-return to zero (NRZ) pulse encoding, as depicted by FIG. 4. Recall that, in this channel, timing is based upon packet transmissions, rather than a clock signal or actual time.

The receiver Eve samples the stream of events (packets of class x) at a frequency greater than the Nyquist frequency to guard against aliasing. The frequency in this channel is represented by the size of the sampling window which needs to be an appropriate fraction of the signal construction window $w_i$ that Alice uses. For example, if $w_i$ is 64 packets wide, then samples might be 16 packets at a time. The buffer reordering, transmission of packets generated by other network devices. and dummy transmission of the boundary controller constitutes noise on this channel, so the basic signal $x_i$ is actually the sum $x_i=z_i+v_i$ of the signal $z_i$ transmitted by Alice and the noise $v_i$ created by the boundary controller. The noise signal $v_i$ is also partially due to the presence of other insiders we refer to collectively as Clueless because they are unaware of the covert channel. The actual sources corresponding to Alice and Clueless can be any entity that could generate packets inside the information flow boundary.

In order to filter out this noise, the receiver Eve applies a moving average filter $$y_i = \sum_{k=0}^{L} h_{k-L} x_{n+k-L}$$

to get the estimated signal $y_i$. The weighting coefficients $h_k$ are chosen to maximize noise suppression while keeping the estimated signal $y_i$ close to the transmitted signal $z_i$. A simple example of such a filter (the filter is non causal, but Eve is processing the entire transmission after the fact, so this is not an issue) might be $$y_i = \frac{1}{4} x_{i-1} + \frac{1}{2} x_i + \frac{1}{4} x_{i+1} \Big|$$

to strongly bias the filter toward the current signal.

The noise introduced by the boundary controller also distorts the timing of the symbols sent by Alice. In our example channel, Eve solves this problem by recovering the timing information from the received signal. The approach is similar to the one used in Ethernet systems: the received signal is passed through a differentiation filter to emphasize the transitions; then passed through a squaring or absolute value filter to force all transitions to be the same direction and filially passed through a phase-locked loop to obtain a local clock signal. The example we have just presented uses relatively straightforward signal processing technology. The example should make it clear that actual event-based statistical covert channels could make use of even more sophisticated digital signal processing technology to achieve practical efficiency.

Our invention blocks this type of covert channel. The FDREBCP is designed to fill its FDREB's with packets. When a FDREB is filled with packets, the buffer is released and the packets are transmitted in the order they are in the FDREB. Since the population of the buffer pool types does not vary, either at all in the fixed case, or slowly, in the tunable case, Alice cannot effectively modulate the mean number of x packets. No information is passed over the covert channel.

While the present invention has been described with respect to exemplary embodiments thereof, it will be understood by those of ordinary skill in the art that variations and modifications can be effected within the scope and spirit of the invention.

What is claimed as new and desired to be protected by Letters Patent of the United States is:

1. A method of limiting event-based covert channels blocks occurring outside an information flow boundary, comprising:
   sampling an event;
   calculating a running estimate of a statistic associated with the event; and
   applying a channel controller comprising a fixed distribution randomized event buffer construction processor (FDREBCP) and a fixed distribution randomized event buffer (FDREB) to the event to control a bit pattern, timing, and ordering that are allowed outside the information flow boundary, wherein the applying of the channel controller comprises:
   storing the event in the FDREB during occurrence of the event;

subsequently removing the event from the FDREB and reordering the event; and creating a dummy event to prevent an unauthorized outsider modulating timing of events by alternatively causing and not causing the event.

2. A method as in claim 1, wherein the FDREB applies a typing of elements to the event.

3. A method as in claim 2, wherein the FDREB further applies a typing to empty cells of the FDREB according to a desired probability distribution.

4. A method as in claim 3, wherein typed elements are assigned in a random order.

5. A method as in claim 2, wherein the FDREB incorporates an untyped element fillable with an event of a user-selected type.

6. A method as in claim 2, wherein a type is assigned to the event in accordance with a current demand.

7. A controller for an event-based statistical covert channel, comprising:
- a data receiver;
- a data transmitter; and
- a channel controller comprising a fixed distribution randomized event buffer construction hardware processor (FDREBCP) and a fixed distribution randomized event buffer (FDREB) to control a bit pattern, timing, and ordering that are allowed outside an information flow boundary, wherein the FDREBCP holds event distribution data that define one or more fixed distributions that the FDREBCP employs to fill the FDREB, whereby the event distribution data is stored during occurrence of an event, subsequently removed the event distribution data from the FDREB and reordered the event distribution data, and a dummy event distribution data created to prevent an unauthorized outsider modulating timing of events by alternatively causing and not causing the event.

8. A controller as in claim 7, wherein the FDREB applies a typing of elements to the event.

9. A controller as in claim 8, wherein the FDREB further applies a typing to empty cells of the FDREB according to a desired probability distribution.

10. A controller as in claim 9, wherein typed elements are assigned in a random order.

11. A controller as in claim 8, wherein the FDREB incorporates an untyped element Tillable with an event of a user-selected type.

12. A controller as in claim 8, wherein a type is assigned to the event in accordance with a current demand.

* * * * *